United States Patent
Gilchrist

[15] 3,645,487
[45] Feb. 29, 1972

[54] STRUCTURAL MEMBER

[72] Inventor: David W. Gilchrist, 215 West Water Street, Elmira, N.Y. 14901

[22] Filed: Dec. 4, 1969

[21] Appl. No.: 881,947

[52] U.S. Cl. ............................248/354 S, 248/357, 240/2
[51] Int. Cl. ..................................................E04g 25/00
[58] Field of Search..................248/44, 354 H, 354 L, 354 P, 248/354 R, 354 S, 356, 357

[56] References Cited

UNITED STATES PATENTS

| | | |
|---|---|---|
| 776,881 | 12/1904 | Ambrose............................248/357 X |
| 2,263,138 | 11/1941 | Olson......................................248/44 |
| 2,487,235 | 11/1949 | Goss....................................248/44 X |
| 3,280,527 | 10/1966 | Faust..................................248/356 X |
| 3,327,310 | 6/1967 | Bethune et al......................248/356 X |
| 3,479,990 | 11/1969 | Crow..................................248/356 X |

FOREIGN PATENTS OR APPLICATIONS

| | | |
|---|---|---|
| 1,193,462 | 5/1965 | Germany..............................248/357 |

*Primary Examiner*—William H. Schultz
*Attorney*—John E. McGarry

[57] ABSTRACT

A structural member for removable insertion between two planar surfaces, designed to withstand eccentric loads of a magnitude less than will cause such deflection of its member as to reduce its effective length; the member comprising a column extending between two generally parallel, rigid surfaces arranged at a fixed, constant spacing; at least the upper portion of the column having a rigid structural sleeve of increasing cross-sectional dimension in an upwardly direction, the upper end of which makes positive bearing around its periphery with the upper parallel surface.

13 Claims, 12 Drawing Figures

Patented Feb. 29, 1972  3,645,487

INVENTOR
DAVID W. GILCHRIST

BY *Price Heneveld Huizenga & Cooper*

ATTORNEYS

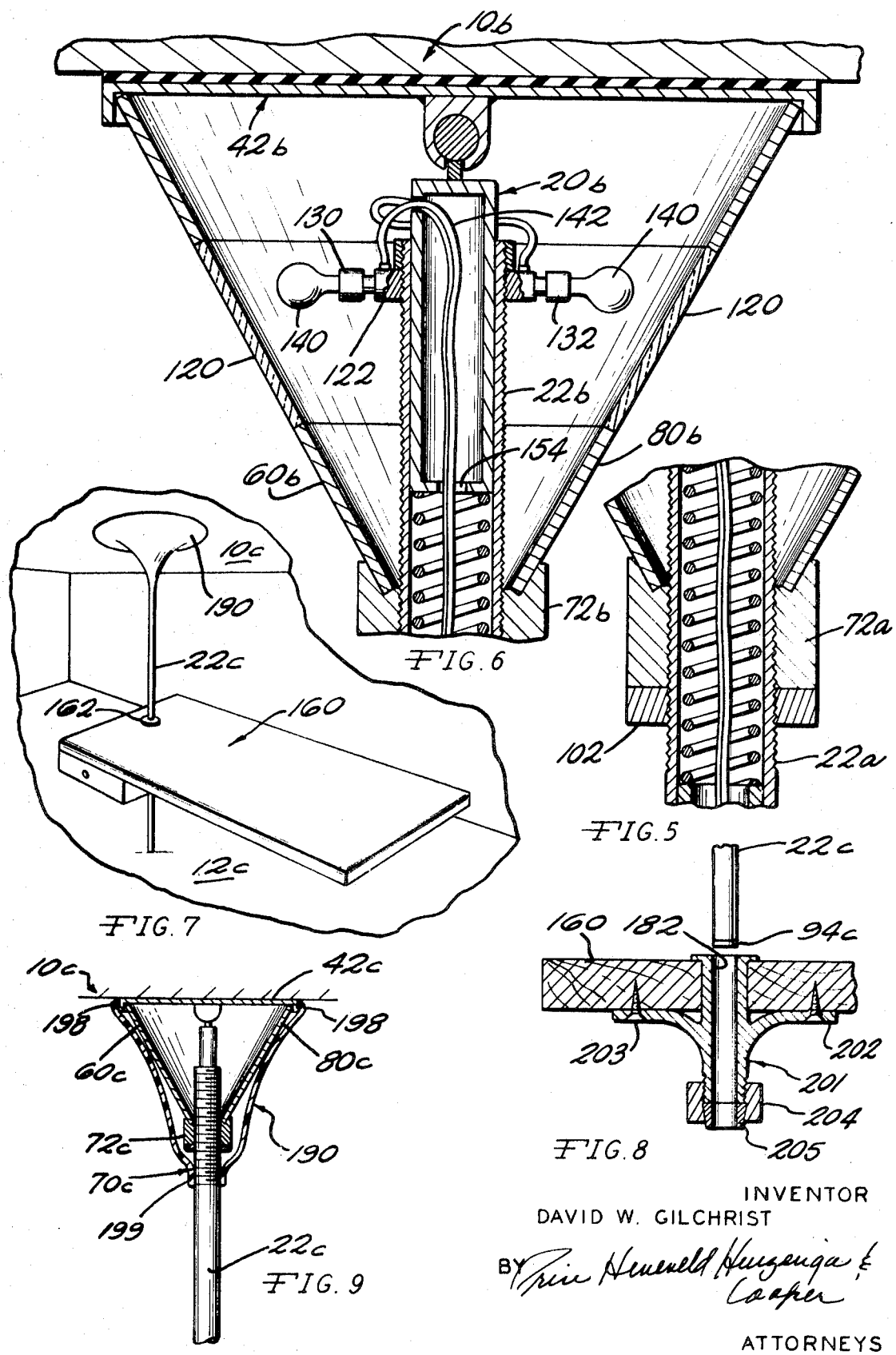

Patented Feb. 29, 1972

INVENTOR
DAVID W. GILCHRIST
BY
ATTORNEYS 3,645,487

STRUCTURAL MEMBER

BACKGROUND OF THE INVENTION

Conventional structural members designed to be readily removable and still exert, when installed, force between two parallel planes, take a variety of shapes, one of which for example is a pole jack. Conventional jacks have the disadvantage of a relatively complex structure which is generally unattractive. They are also not designed to withstand eccentric loads. A more attractive form is the collapsible pole. However, conventional poles are of limited capacity, even with respect to loads applied parallel to their axis due to bending. As the length of the pole is increased, the tendency of the pole to deflect or bend sideways increases geometrically. This is generally due to the fact that conventional collapsible poles comprise only two telescoping cylinders. Further such poles, by their very nature, have a narrow base at each end which makes them unstable under forces acting upon them in a direction other than parallel to their axis still further, the poles must be set by eye and, accordingly, there is no means of assuring that the pole is perpendicular to either surface. This problem is further accentuated with transverse loading where further deviation from perpendicular relationship between pole and ceiling can occur.

SUMMARY OF THE INVENTION

In its generic sense this invention relates to a vertical support which extends between two generally parallel rigid surfaces of a fixed spaced relationship. The support consists of a structure which can be inscribed within a cone having its apex bearing on the lower of the surfaces and its end of larger diameter bearing against the upper of the surfaces. Within this inscribing cone the structure may take a number of different specific forms including the use of a central vertical column at least a portion of the length of which is surrounded by an upwardly and outwardly flaring rigid, supporting structure which bears firmly against the upper surface at a substantial number of generally equally spaced points along its entire upper periphery. Within the limits of an inscribing cone extending the length of the vertical support and having a maximum apex angle of 30°, the wider the apex angle and greater the percentage of the total length of the support column the flaring supporting structure extends, the greater the strength and stability of the structure. In a specific form of my invention, I have provided a structural member for exerting force between two generally parallel planar members, the structural member comprising two telescoping tubes, means biasing said tubes away from each other, a plate, means pivotally mounting the plate at one end of one of the tubes, and means for removably maintaining the plate perpendicular to the axis of the tubes, the maintaining means being activated when the axis is perpendicular to the planar members. Included also are means on the other of the tubes for locking the maintaining means into position and means for preventing the locking means from coming unlocked.

Accordingly, it is an object of the invention to provide a structural member which is easily installed or removed from between two planar surfaces, which can support heavy loads applied either parallel to or eccentric of its axis.

It is a further object of this invention to provide such a structure which will permit the vertical supporting column or pole to realize a substantially higher proportion of its ultimate compressive strength.

It is another object of the invention to provide a structural member of the above character which can be utilized as the support for the furniture of a type exerting an eccentric bending load on the column.

It is a further object of the invention to provide a structural member of the above character which, once installed, is stable against accidental displacement from its supporting position.

Other objects and advantages will become apparent upon reference to the following drawings and detailed discussion.

BRIEF DESCRIPTION OF THE DRAWINGS

FIG. 5 is a fragmentary sectional view similar to FIG. 2 and illustrating an alternate embodiment;

FIG. 6 is a sectional view similar to FIG. 2 and illustrating still another alternate embodiment;

FIG. 7 is a perspective view illustrating yet another embodiment wherein the structural member is utilized to support a desk or table;

FIG. 8 is a fragmentary elevational view illustrating the assembly of the articles illustrated in FIG. 7;

FIG. 9 is a fragmentary sectional view of the top of the structural member illustrated in FIG. 7;

DESCRIPTION OF THE PREFERRED EMBODIMENTS

Figures 1, 2:
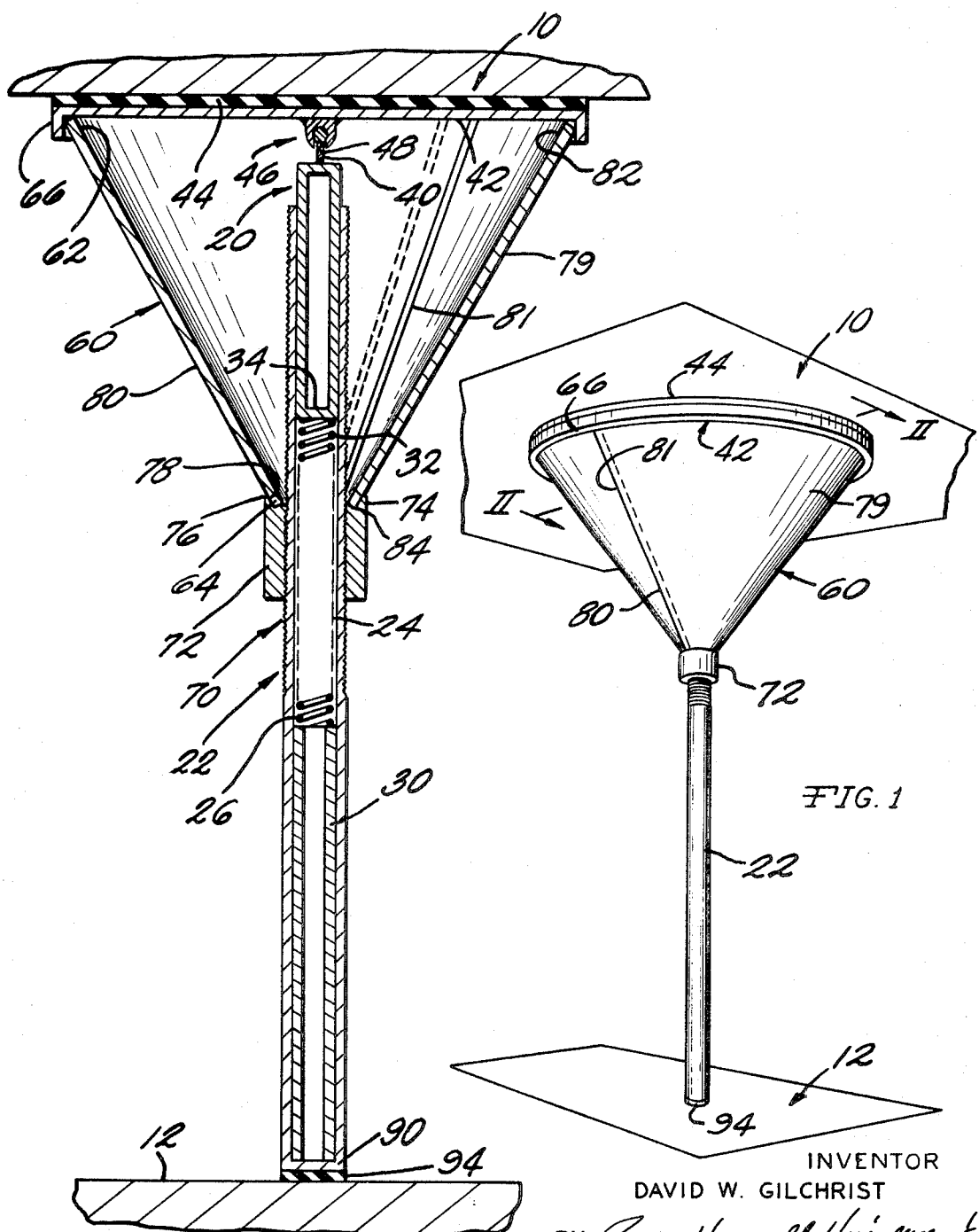
FIG. 1 is a perspective view of a structural member constructed in accordance with the invention.
FIG. 2 is a sectional view taken generally along the line II—II of FIG. 1.

The invention concerns a structural member for installation between any two planar surfaces, the surfaces being designed to carry and deliver through the structural member various loads. As shown in FIG. 1, the two planar surfaces 10 and 12 are horizontal and may comprise such things as the floor and ceiling of a room. The two planar surfaces must be fixed, rigid and resistant to deformation by crushing or puncture under the anticipated working loads.

Figure 10:
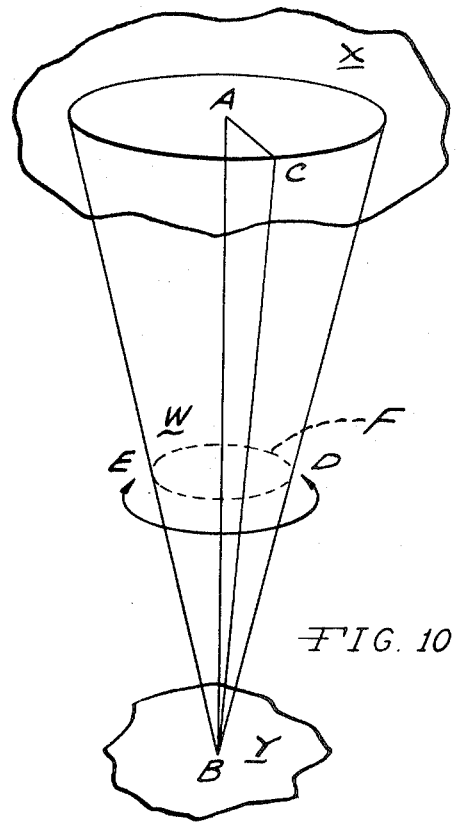
FIG. 10 is a schematic diagram of the basic principles of the invention.
Figure 11:
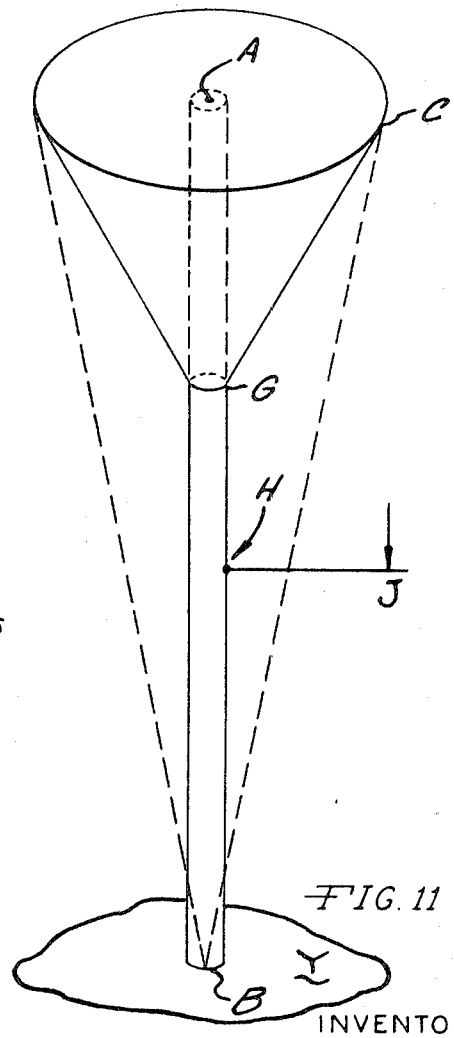
FIG. 11 is a schematic diagram of a specific modification of the invention executed within the principles of FIG. 10.

The basic principles of the invention are illustrated in FIGS. 10 and 11. The principle structural member is a rigid load supporting column AB extending between the generally parallel surfaces X and Y and normal to both surfaces. About the column AB an inverted triangular plane ABC is rotated, as indicated by the arrows D, E, forming a cone having its greater diameter at the top and inscribing an area equal to the circular path traced by the point C. The end A of the column AB must be positively held against displacement from the center of the circular area traced by the path C. Also the sides of the cone must be positively held against radial enlargement or noncircular distortion of the circular area. Assuming the column AB to be the primary bearing member for vertical loads, to prevent columnar bending or deflection under compression loading, one or more radially extending stiffeners F may be added between the pole and the conical support. The sides of the cone must be rigid and resistant to flexing under the expected load.

FIG. 11 illustrates the fact that within the theoretical conical area formed by rotation of the triangular plane ABC, the length of the cone may be reduced under many operating conditions. This will reduce the total load-supporting capacity of the structure. The extent of this reduction will depend upon the ratio of the diameter of the central column AB to its greatest unsupported length, in this case, the length BG. This length BG will be subject to side flexing or bending due to excessive compressive loads, even in the absence of any eccentric loads which might be applied, such as at the free end J of the moment arm HJ.

Figure 12:
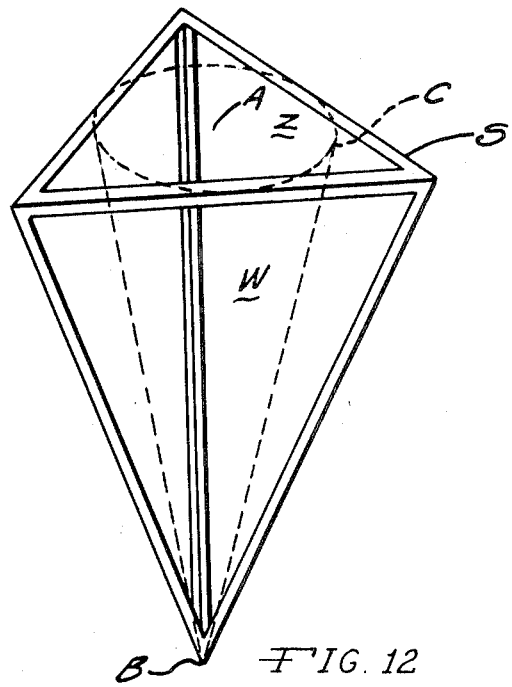
FIG. 12 is a schematic diagram of a further modification of the invention executed within the principles of FIG. 10.

FIG. 12 illustrates the fact that the supporting structures for the column AB may take a form other than conical with the same basic functional effect, provided the geometry of the supporting structure inscribes the conical volume generated by rotation of the triangular plane ABC and the same locational stability of the end A of the column with respect to the conical supporting structure is maintained.

Figures 3, 4:
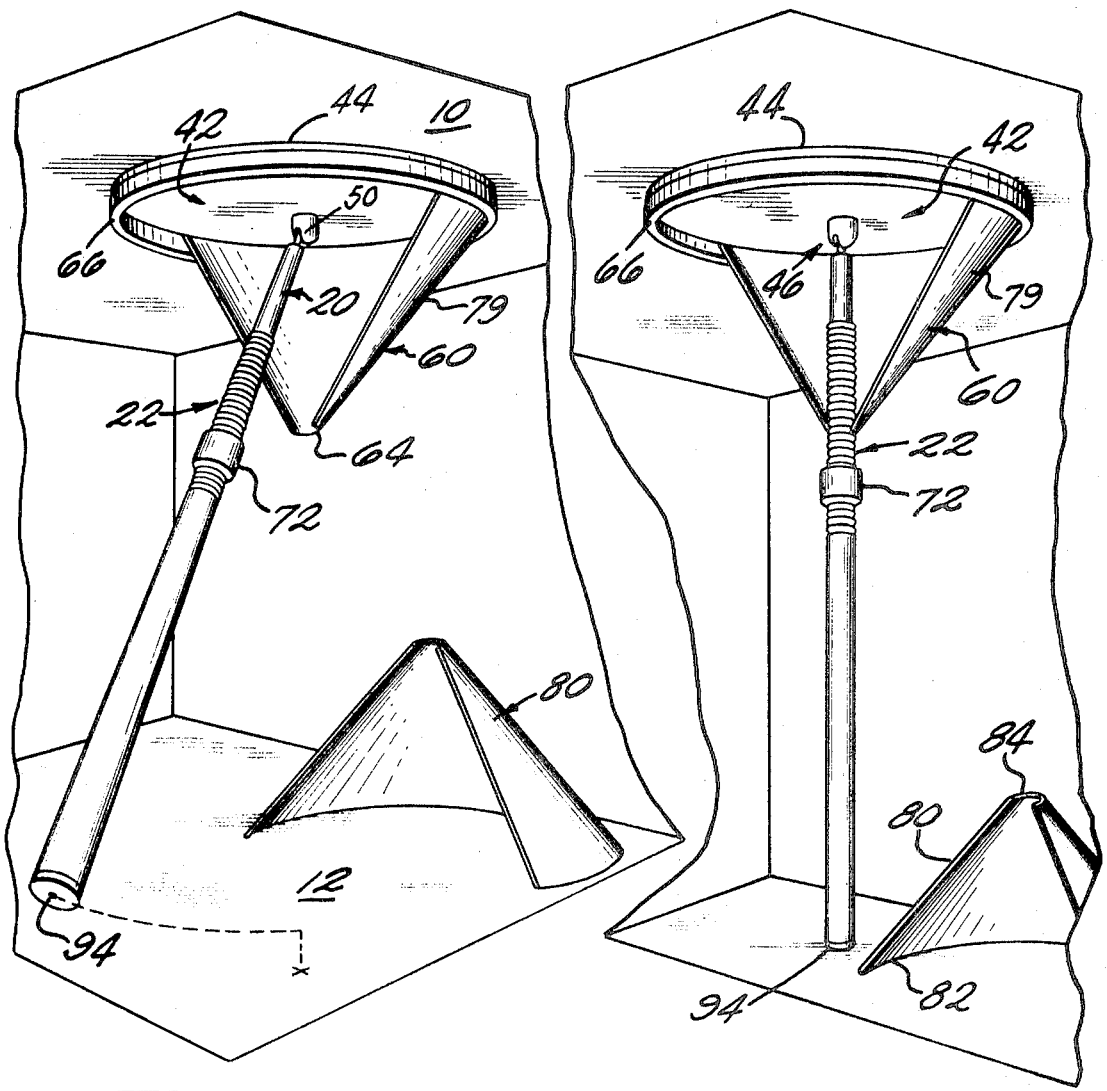
FIG. 3 and FIG. 4 are perspective views illustrating the procedures in installing the structural member of FIG. 1.

With reference now to FIGS. 1 and 2, the structural member of the invention comprises two telescoping tubes 20 and 22, the former telescoping into the latter, a compression spring 24 biasing the tube 20 away from the tube 22. The end 26 of the spring 24 rests upon a suitable stop such as the top end of the sleeve 30 of the tube 22, while the other end 32 of the spring compresses against the end 34 of the tube 20. Unlike other collapsible poles, the tube 20 has at its other end 40 a load-bearing plate 42 of considerable diameter mounted thereon. Preferably, a resilient pad 44 covers the entire upper surface area of the plate 42. Loading of the entire area of plate 42 will result in large frictional resistance to movement between the surface 10 and the plate 42. The plate 42 is secured to the end of the tube 20 by a ball joint permitting universal movement of the plate with respect to the tube. This permits the plate to automatically adjust to obtain full contact with the surface 10. The joint may have a slot 50 permitting limited swinging movement of the tube to a substantial angle in one direction to facilitate installation (FIG. 3).

To removably maintain the plate 42 perpendicular to the axis of the tubes 20 and 22, a truncated, generally conical section 60 having an upper base 62 and a lower apex or neck end 64 is held in place with the base pressed against the plate 42 and the neck 64 seated around the tube 22. To keep the base end 62 pressed against the plate 42 and to transmit forces between the section 60 and the plate, the latter includes a flange 66 which extends along a circular path defined by the circumference of the plate 42 and depends perpendicularly therefrom. The flange 66 need not be continuous and any other suitable structure may be substituted which will engage and positively secure the section 60 against outward movement under compressive loads acting axially of the tubes 20 and 22. To secure the neck end 64 to the tube 22, the tube is provided with external threads 70, and an internally threaded collar 72 is screwed thereupon into a position in which it engages the neck end 64 of the section 60. To accomplish this, the collar includes a lip 74 at one end thereof, the lip comprising an external wall 76 and an internal wall 78, the latter of which has the same slope as the section 60 forming a recessed seat for the lower end of the section 60.

To facilitate installation of the conical section 60, the section may be assembled from two portions 79 and 80. The portion 80 is generally congruent to section 79, but has a slightly larger diameter base end 82 and neck end 84. These larger diameters allow the section 80 to overlap the section 79 at 81 to complete the cone shape as illustrated in FIG. 1. As in the case of section 79, the base end 82 and the neck end 84 of the section 80 are confined within the flanges 66 and the lip 74 respectively.

To facilitate the installation of the structure, the section 79 may be permanently secured to the plate 42 and automatically positioned with the plate. However, this is unnecessary to the practice of the invention since both sections 79 and 80 may be separate parts which can be assembled with the plate 42 and poles at the point of installation. Also the sections 79 and 80 can be identical and merely butt together when the collar 72 is tightened.

It is important that the conical sections 79 and 80 be so designed that they will not flex or otherwise deflect under the compressive loads which may be applied to them as a result of the anticipated operating requirements. The more eccentric the loading applied to the column, the greater the compressive loads applied to the sections 79 and 80. The sections 79 and 80 provide a side brace for the tubes, thus materially reducing the unsupported, columnar length of the tubes. This greatly increases the maximum axial load which may be applied to the tubes. The engagement between the upper base of the sections with the restraining edges of the plate 42 prevents the sections from spreading apart in response to these loads. It is important that the section 60, whether its shape is conical or otherwise and whether formed of a single or multiple pieces, provides the column with uniform support at all points around the circumference of the conical section 60 so that the axial load can be distributed over the upper surface of the plate 42.

To increase the frictional grip of the other end 90 of the tube 22 a resilient pad 94 of a material having a high coefficient of friction is used. It extends over the entire end surface 90.

OPERATION

Turning now to FIGS. 3 and 4, the structural member is installed by placing the plate 42 in the position desired on the one planar surface 10 and swinging the tubes 20 and 22 into position so that the axis of the tubes is perpendicular to the planes 10 and 12 with plate 42 flat against the surface 10 due to the universal joint between the upper column 10 and the plate 42. This is accomplished by moving the tube 22 so as to further telescope the tube 20 therein, compressing the spring 24 thereby. This is possible because the collar 72 has been turned to a lowered or release position as shown in FIG. 4. Preferably, the portion 79 has been preassembled to the base 42. After the tubular column has been positioned vertically, the second portion 80 is slipped into place overlapping the section 79 at 81 with its base end 82 confined by the flange 66 and the neck end 84 encompassing the tube 22. The collar 72 is then screwed upwardly into position to engage the ends 64 and 84 of the sections 79 and 80 within the lip 74, thereby rigidly locking the structural member into place.

It will be obvious to one skilled in the art that because of the relatively wide diameter of the plate 42, it is not possible to pull the tube 22 out from between the two planar surfaces 10 and 12, as to do so would require that the plate 42 press into the planar surface 10. Thus, the initial angular relationship between the tube 22 and the plate 42 is rigidly maintained.

FIG. 5 illustrates an alternate embodiment wherein a safety lock is incorporated on the collar 72. Parts which are similar to the previous embodiment bear the same reference numeral to which the distinguishing suffix "a" has been added. To secure the collar 72, a lock nut 102 has been added, preventing it from loosening.

FIG. 6 illustrates still another embodiment wherein the structural member provides the additional function of a light source. In this embodiment, parts which are similar to parts shown in FIG. 2 are given the same reference numeral to which the distinguishing suffix "b" has been added. Thus, the telescoping tubes 20b and 22b are positioned between the same planar members with the plate 42b and the conical sections 79b and 80b locked by the collar 72b insuring that the structural pole member cannot be shifted with respect to the two planar members. However, in this case, the conical sections 79b and 80b include transparent portions or panels 120 formed of materials such as "Plexiglas" or the like, and the socket-supporting collar 122 is mounted to the tube 22b above the collar 72b. Sockets 130 and 132 extend from the collar 122. Conventional incandescent bulbs 140 may be mounted in the sockets. Any other light source may be used. To electrically connect the light bulbs 140, conventional wires 142 extend through the tubes 20b and 22b.

It will be readily appreciated that in this embodiment the structural portions of the sections 79b and 80b which surround the transparent panels must be of sufficient strength to withstand the expected operating loads which will be imposed upon the structure. This, of course, will depend upon whether it is to serve a dual purpose, that is, a function other than as a light source. It will be recognized that even as a light source, even if the section 60 has only limited structural characteristics, this invention will have the advantage of being stable against displacement from a laterally applied force, a failing common to the conventional pole lamp.

It is entirely possible to locate the light source exteriorly of the structural cone 60 and encase them in a larger nonstructural outer light transmitting cover. In this way, the strength of the structural cone will not be impaired.

FIGS. 7 through 9 illustrate yet another embodiment wherein the structural member is utilized again as furniture. Parts similar to the embodiment illustrated in FIG. 2 bear the same reference numbers with the distinguishing suffix "c" appended thereto. Thus the tube 22c utilizes a conical section 60c, the structural member being positioned between the planar surfaces 10c and 12c. However, unlike the previous embodiments, a table or a desk top 160 is clamped at 162 by conventional means to the structural member, after the latter is installed.

The desk or table 160 can be installed by sliding it up the tube 22c to the proper height. (FIG. 8.) In this case, the tube 22c is positioned between the planar members such as the ceiling and floor with the table 160 lying on the floor and the hole 182 in the table 160 aligned with the raised tube 22c and directly over the spot which the pad 94c is to occupy.

To distribute the severe loads resulting from this type of mounting, a reinforcement member 201 may be mounted on the tube. The reinforcement member 201 has a radially enlarged flange 202 which seats against and is secured to the lower surface of the work surface 160 by suitable means such as the screws 203.

The desk top, once raised to the proper height, is secured by tightening the wedging nut 204. The nut 204 engages the threaded end of the reinforcement member 201 and is provided with a split clamping collar 205. This collar securely clamps the tubes 22c as the nut is tightened. It will be recognized that numerous other mechanical devices could be employed to secure the desk top or any other structure to the tube 22c.

Referring to FIGS. 7 and 9, it will become apparent that the structural sections 79c and 80c may be concealed after the device is completely installed. This can be accomplished by enclosing them in an additional cover 190 having a parabolically or other curved surface. The cover 190 can be a single piece secured by any suitable means such as a snap fit with suitable projections 198 on the plate 42c. The cover 190 may also have a depending tubular sleeve 199 of sufficient length to cover and conceal the external threading on the post 22c. It will be recognized that since the cover 190 is nonstructural, it can be made of any suitable decorative material.

It will be recognized that as the eccentric loading imposed upon the pole is increased, such as by increasing the size of the desk area and thus the bending load imposed upon the pole, either the structure of the pole or the length of the structural cone or both must be proportionally increased. In some situations the structural cone may be extended downwardly a major portion of the distance to the desk surface or even all the way to it.

It is also possible to so mount the desk surface that it may be rotated about the pole. This is possible since the entire pole structure, except for the desk surface, is symmetrical about the axis of the pole. It will also be recognized that the reference to a desk surface is merely illustrative. Any other type of suspended eccentric loading may be applied such as, for example, seating or storage cabinets.

It will also be recognized that the conical section 60 may be a single integral member rather than consisting of two separate portions. Such a modification will only affect the details of installation rather than the functional fundamentals of this invention.

Other embodiments will become apparent to one skilled in the art wherein the basic structure is utilized in a slightly different form, still in keeping with the inventive concept.

The embodiments of the invention in which an exclusive property or privilege is claimed are defined as follows:

1. A structural member for removable insertion between upper and lower planar and substantially parallel surfaces, said structural member comprising:
    a first column member having a lower end in contact with and supported by said lower planar surface;
    a weight distributing plate having an upper surface flush with said upper planar surface, said upper surface of said weight distributing plate being of a size substantially larger than the diameter of said first column member;
    a second column member extending upwardly from said first column member and in contact with said weight distributing plate;
    means resiliently joining the lower portion of said second column member to the upper portion of said first column member;
    an auxillary support element extending between an upper portion of said first column member and outer portions of said weight distributing plate, an upper peripheral edge of said auxillary support element being in supporting relationship to said weight distributing plate, said auxillary support element having an increasing cross-sectional dimension in an upward direction between said first column member and said weight distributing plate;
    positioning means on the under surface of said weight distributing plate for receiving and engaging said upper peripheral edge of said auxillary support element; and
    adjustable means carried by said first column member and forcing said auxillary support element upwardly with respect to said first column member, whereby a rigid load-bearing structure is formed between said weight distributing plate, said auxillary support member, and said first column member.

2. A structural member according to claim 1 and further comprising a universal movement joint between said second column member and said weight distributing plate to permit universal movement of said plate with respect to the upper end of said second column member, whereby said weight distributing plate is automatically adjusted to obtain full contact with said upper planar surface.

3. A structural member according to claim 2 and further comprising means on the lower portion of said auxillary support element to engage said first column member.

4. A structural member according to claim 3 wherein said weight distributing plate has positioning means for said upper peripheral edge of said auxillary support means such that said first column member is positioned perpendicular to said weight supporting plate when said upper peripheral edge engages said positioning means and said auxillary support element engages said first column member.

5. A structural member according to claim 4 wherein said positioning means comprises a downwardly extending flange on the underside of said weight distributing plate.

6. A structural member according to claim 1 wherein said auxillary support element is of a shape to inscribe a conical volume.

7. A structural member according to claim 6 wherein said auxillary support element is formed by vertical sections.

8. A structural member according to claim 1 wherein said second column member is telescopingly received within said first column member.

9. A structural member according to claim 1 wherein said adjustable forcing means comprises a collar which threadably engages said first column member, said collar having means to engage the lower ends of said auxillary support element.

10. A structural member according to claim 1 wherein said auxillary support element is formed from first and second truncated partial conical members adapted to take the form of a truncated cone when closed about said first column member.

11. A structural member according to claim 1 and further comprising a decorative cover surrounding said auxillary support element, said cover being detachably secured to said first column member.

12. A structural member for removable insertion between upper and lower planar and substantially parallel surfaces, said structural member comprising:
    a column member having a lower end in contact with said lower planar surface;
    a weight distributing plate having an upper surface flush with said upper planar surface, said upper surface of said weight distributing plate being of a size substantially larger than the diameter of said column member;
    an auxillary support element extending between an upper portion of said column member and an outer portion of said weight distributing plate with an upper end in contact with said weight distributing plate, said auxillary support element having an increasing cross-sectional dimension in an upward direction between said column member and said weight distributing plate, the lower end of said auxillary support element embracing said column member;

means for orienting and maintaining said column member rigidly perpendicular to said weight distributing plate; said orienting and maintaining means including positioning means on said weight distributing plate for positioning and engaging the upper surface of said auxillary support element;

means in a central portion of said weight distributing plate engaging the upper portion of said column member and positioning said column member so that said weight distributing plate is oriented and maintained perpendicular to said column member; and adjustable means on said column member for forcing said auxillary support member upwardly with respect to said column member and in contact with said weight distributing plate.

13. A structural member according to claim 12 wherein said auxillary support element is conically shaped.

* * * * *